(12) United States Patent
Ratcliff et al.

(10) Patent No.: US 9,894,116 B2
(45) Date of Patent: Feb. 13, 2018

(54) TECHNIQUES FOR AUGMENTED SOCIAL NETWORKING

(75) Inventors: Joshua J. Ratcliff, San Jose, CA (US); Kenton M. Lyons, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 31 days.

(21) Appl. No.: 13/976,457

(22) PCT Filed: Apr. 12, 2012

(86) PCT No.: PCT/US2012/033231
§ 371 (c)(1),
(2), (4) Date: Jun. 17, 2014

(87) PCT Pub. No.: WO2013/154562
PCT Pub. Date: Oct. 17, 2013

(65) Prior Publication Data
US 2014/0368538 A1    Dec. 18, 2014

(51) Int. Cl.
*G06T 19/00*     (2011.01)
*H04W 4/02*     (2009.01)
*G06Q 50/00*    (2012.01)
*H04L 29/06*    (2006.01)
*G06Q 50/10*    (2012.01)
(Continued)

(52) U.S. Cl.
CPC ........ *H04L 65/403* (2013.01); *G06K 9/00885* (2013.01); *G06Q 50/01* (2013.01); *G06Q 50/10* (2013.01); *G06Q 50/30* (2013.01); *G06T 19/006* (2013.01); *H04W 4/043* (2013.01); *H04W 4/02* (2013.01)

(58) Field of Classification Search
CPC  G06K 9/00201; G06K 9/00885; G06F 3/012; G06F 3/011; G06Q 50/01; G06Q 50/10; G06Q 50/30; H04L 65/403; H04W 4/02; H04W 4/043; G06T 19/006
USPC .......................................... 345/629, 632–633
See application file for complete search history.

(56) References Cited

U.S. PATENT DOCUMENTS 8,743,145 B1 *   6/2014   Price .................... G09G 5/00
                                                                          345/629
2007/0282887 A1*  12/2007  Fischer ............. G06F 17/30867
                                                                       707/999.102

(Continued)

FOREIGN PATENT DOCUMENTS

KR     10-2010-0124947 A    11/2010

OTHER PUBLICATIONS

Office Action and Search Report received for Taiwanese Patent Application No. 102112684, dated Feb. 13, 2015, 25 pages including 9 pages English translation,.

(Continued)

*Primary Examiner* — Chante Harrison

(57) ABSTRACT

Techniques for augmented social networking may include receiving an image. After receiving an image, in real time, an identity of a person in the image may be determined. Association information for the person based on the identity and one or more defined parameters may be determined. The defined parameters may represent electronic communication. Location information of the person may be determined. The association information may be presented proximate to the person in an augmented reality view using the location information. Other embodiments are described and claimed.

25 Claims, 9 Drawing Sheets

Name: Sarah Smith
Married to: Ben Smith
Close friends with Jessica Brown since 2004

(51) Int. Cl.
  *G06Q 50/30* (2012.01)
  *H04W 4/04* (2009.01)
  *G06K 9/00* (2006.01)

(56) References Cited

U.S. PATENT DOCUMENTS

| | | |
|---|---|---|
| 2009/0102859 A1 | 4/2009 | Athsani et al. |
| 2011/0169932 A1 | 7/2011 | Salvador et al. |
| 2011/0221793 A1 | 9/2011 | King et al. |
| 2011/0310120 A1 | 12/2011 | Narayanan |
| 2012/0010928 A1 | 1/2012 | Watfa et al. |
| 2012/0019557 A1* | 1/2012 | Aronsson ............... G06T 11/00 345/633 |
| 2012/0233015 A1* | 9/2012 | Calman ............ G06Q 30/0633 705/26.8 |
| 2012/0265703 A1* | 10/2012 | Basra ................... G06Q 10/10 705/319 |
| 2012/0293548 A1* | 11/2012 | Perez ................... G06T 19/006 345/633 |
| 2013/0042296 A1* | 2/2013 | Hastings ................ G06F 21/10 726/1 |
| 2013/0044130 A1* | 2/2013 | Geisner ................... G09G 5/00 345/633 |
| 2013/0093759 A1* | 4/2013 | Bailey ..................... G09G 5/00 345/419 |
| 2014/0002490 A1* | 1/2014 | Teegan ................. G06T 19/006 345/633 |
| 2014/0306994 A1* | 10/2014 | Brown ................. G06T 19/006 345/633 |
| 2014/0362111 A1* | 12/2014 | Kim ...................... G06T 19/006 345/633 |
| 2015/0309316 A1* | 10/2015 | Osterhout ............... G06F 1/163 345/8 |
| 2015/0325050 A1* | 11/2015 | Roh ...................... G06F 17/241 345/633 |
| 2016/0171306 A1* | 6/2016 | Calman ................. G06Q 10/00 345/633 |

OTHER PUBLICATIONS

International Search Report and Written Opinion, dated Dec. 21, 2012, Application No. PCT/US2012/033231, Filed Date: Apr. 12, 2012, pp. 12.

* cited by examiner

Name: Sarah Smith
Married to: Ben Smith
Close friends with Jessica Brown since 2004

Device 10

TECHNIQUES FOR AUGMENTED SOCIAL NETWORKING

BACKGROUND

Currently, people may learn information about other people using technology. The technology may include social networking websites, email communication, short message service (SMS) and instant messaging. Technology can connect people so that a viewer of a social networking website can learn about another person's social associations. For example, on networking sites, a viewer may learn about another person's relationship status, such as whether the person is dating, engaged or married. A viewer may also learn about the other person's family such as who is their mother, father, brother, cousin, niece and nephew. The social networking site may provide information, such as who is a friend of the person and activities that the person enjoys participating in.

All this information is provided to a viewer when he/she is using his/her electronic device. Often a viewer is reading about a person's associations when he/she is at home, work, coffee shop or other location. However, the information is presented in a vacuum as it is unrelated to the people currently surrounding a viewer. For example, a viewer must remember a person's information when he/she sees that person at a social gathering. Alternatively, a viewer must look up the person after they meet them in order to learn more information about the person's associations. It is with respect to these and other considerations that the present improvements have been needed.

DETAILED DESCRIPTION

Figure 1:
FIG. 1 illustrates an embodiment of an augmented social networking application.
Figure 1:
Figure 1:

Various embodiments are directed to techniques for augmented social networking. In an embodiment, an image may be received. After receiving the image, in real time, an identity of a person in the image may be determined and association information for the person based on the identity and one or more defined parameters may be determined. The defined parameters may represent electronic communication. Location information of the person may be determined in real time. The association information may be presented proximate to the person in an augmented reality view using the location information. As a result, a viewer of the augmented reality may determine information about the person in real time.

In an embodiment, a computing device may receive the electronic communication and location information of a person. The computing device may render the augmented reality view based on the electronic communication and the location information. In an embodiment, the computing device may be a pair of glasses with a partially transparent display which a viewer may wear in order to view the augmented reality. In an embodiment, the computing device may be a mobile device which a viewer may use to view the augmented reality. In an embodiment, a viewer and the person may be located in the same physical location. Using the computing device, the viewer may simultaneously view the person and association information about the person. In an embodiment, association information may be visually depicted proximate to the person. For example, the association information may be visually depicted on top of or next to the person in the augmented reality view in order to assist the viewer in learning about the person. The embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an embodiment of an augmented social networking application. In an embodiment, a computing device 10 may include, but is not limited to, a pair of glasses, a computer, a workstation, a desktop computer, a laptop computer, a tablet, a mobile device, a notebook computer, a handheld computer, a telephone, a cellular telephone, a personal digital assistant (PDA), a combination cellular telephone and PDA, and so forth.

A viewer 12 may use the computing device 10 for an augmented reality view. A person 15 may be standing near viewer 12 as shown in FIG. 1. The viewer 12 may look into his/her device for a rendered augmented reality view which depicts both the person 15 as well as information 17 about the person 15. In an embodiment, as shown in FIG. 1, the person 15 and information 17 about the person 15 may be simultaneously viewed by the viewer 12.

In an embodiment, the information 17 may be association information. In an embodiment, the association information 17 may include important information about the person, such as the person's name, age, birthday, marital status and/or profession. In an embodiment, the association information may include the people and/or activities commonly enjoyed by both the viewer and the person. For example, the viewer 12 may view association information about a person 15. The person 15 may be named Sarah Smith and may be married to Ben Smith. In an embodiment, the association information 17 may include associations that the person 15 has in common with the viewer 12. For example, both the viewer 12 and the person 15 may know Jessica Brown. As a result, the rendered association information 17 may include information about the relationship between the person 15, Sarah Smith, and the commonly known person, Jessica Brown. For example, the association information may state that Sarah Smith is close friends with Jessica Brown since 2004. As shown in FIG. 1, the device may overlay the association information of people obtained through electronic communication onto the viewer's live real world view of those people.

Figure 2:
FIG. 2 illustrates a block diagram for a system

FIG. 2 illustrates a block diagram for a system 100 for an augmented social networking application 105. In one embodiment, the augmented social networking application 105 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

The augmented social networking application 105 may occur within a computing device 10 as shown in FIG. 1. In an embodiment, the computing device 10 may include, but is not limited to, a pair of glasses, a mobile device and/or a handheld system. In an embodiment, the pair of glasses may include one or more computing components and/or computing capabilities.

The augmented social networking application 105 may comprise a recognition component 110. In an embodiment, a recognition component 110 may determine an identity of a person in an image. In an embodiment, the image may be taken with a camera on the computing device. In an embodiment, a camera may be a digital camera which captures still and/or moving images. The camera may capture and/or record, in pictures and/or videos, objects in a real world environment. In an embodiment, the camera may capture an image. The image may include multiple objects. The augmented social networking application 105 may receive the image. In an embodiment, the recognition component 110 in the augmented social networking application 105 may determine which objects in the image are people. The recognition component 110 may determine which objects are people by using image, skin and/or facial recognition technology.

In an embodiment, the recognition component 110 may determine the identity of one or more people in the image. In an embodiment, the recognition component 110 may determine the identity of a person via facial recognition technology. In an embodiment, the recognition component 110 may determine the identity of the person by comparing the image with one or more stored digital images of the person. In an embodiment, image may be a photograph of the person. The identity of the person may be determined by comparing the image to a photograph in the electronic communication. In an embodiment, photograph in the electronic communication may be a photograph posted on social networking websites, such as, but not limited to, a person's Facebook® profile picture.

In an embodiment, the recognition component 110 may use infrared beacons to determine the identity of the person. For example, the recognition component 110 in the system 100 may determine the identity a person who is wearing or holding another computing device with an infrared beacon. The person's computing device with the infrared beacon may emit a signal or pulse code. The signal or pulse code may be used by the recognition component 110 to identify that particular infrared beacon on the person's computing device. For example, the recognition component 110 on the viewer's computing device 10 may receive an infrared signal from the person's computing device. The received infrared signal may be unique to that person's computing device. As a result, the viewer's device can identify the person associated with that computing device. For example, a particular pulse code emitted from a pair of glasses may indicate that the glasses belong to Tom. As a result, the person wearing the glasses may be identified as Tom.

The augmented social networking application 105 may comprise an association information component 115. In an embodiment, an association information component 115 may extract electronic communication in order to create association information. Electronic communication may include metadata from social networking platforms such as, but not limited to, Facebook®, Google+®, Twitter® and/or MySpace®. Electronic communication may include electronic communication mechanisms such as, but not limited to, email, instant messaging and/or short message service. Electronic communication may include past or prior information from the person, such as, but not limited to, who the person previously emailed, and/or current information from the person, such as, but not limited to, who the person is currently instant messaging.

In an embodiment, the association information component 115 may analyze the communication patterns of the electronic communication to extract social networking associations between people. In an embodiment, the social networking associations between people may be depicted via a chart, graph, list and/or other presentation of sorted information. In an embodiment, the characteristic of the association between one or more people may be analyzed using the electronic communication. In an embodiment, the characteristic of the association may include, but is not limited to, when the people last communicated, how frequently the people communicated and how long the association has been in place.

In an embodiment, the association information component 115 may analyze the electronic communication. In an embodiment the analysis of the electronic communication may include, but is not limited to, semantic analysis, natural language processing and/or statistical techniques. The electronic communication may be electronically analyzed in order to characterize the association information between two or more people. For example, the relationship between two people may be characterized as a spousal and/or family relationship, a work relationship such as manager and employee or co-workers, a friendship relationship or a hostile relationship.

The augmented social networking application 105 may comprise a location component 120. In an embodiment, a location component 120 may determine location information of the person. In an embodiment, the location component 120 may be able to directly determine location information using one or more cameras, stereo cameras, sensors, optical sensors, infrared sensors, an accelerometer, a global positioning system, a gyro scope, a solid state compass and/or a radio-frequency identification device.

In an embodiment, the location component 120 may determine a person's position and track the person as he/she moves. The location information of the person may be determined as the person moves from one physical location to another physical location. In an embodiment, one or more stereo cameras may determine location information of the person. In an embodiment, the location information may include, but is not limited to, x, y, z coordinates of the person relative to the viewer's computing device. In an embodiment, x, y, z coordinates for a person may be determined in one or more camera frames so as to track the person's movement. In an embodiment, motion detection estimation techniques may determine the location information of the person. In an embodiment, two cameras may be used to determine the location information of the person. In an embodiment, a single camera may be used and the size of the face of the person may be measured to determine the distance of the viewer from the person. The one or more cameras may be used to determine x, y, z coordinates for the location information of the person based on the computing device of the viewer. In an embodiment, the distance from the camera in the computing device to the viewer's eyes may be calculated and the location information may be adjusted based on the distance. The embodiments are not limited to these examples.

In an embodiment, the location component 120 may indirectly receive location information about a person via a wireless connection. For example, a viewer may not have direct access to the person. However, the viewer's computing device may wirelessly receive location information about the person from a second computing device. The second computing device may be able to determine location information of the person. In an embodiment, the location information may be from the perspective of the second computing device. In an embodiment, the location component may wirelessly receive location information about the person via the second computing device. In an embodiment, the location component may determine the location information of the person based on the received location information from the second computing device. The location component may adjust the received location information in order to determine location information from the perspective of the viewer's computing device.

In an embodiment, the location component 120 may use infrastructure sensing to receive location information about the person. In an embodiment, infrastructure sensing may include an infrastructure device, such as, but not limited to, one or more cameras, stereo cameras, sensors, infrared sensors, and/or a radio-frequency identification device. The infrastructure device may wirelessly communicate with the location component 120 to determine the location information of the person. The viewer's computing device may include a gyro sensor and or infrared beacons in order to determine where a viewer is located in relation to the location information provided by the infrastructure device. Based on the viewer's location relative to the infrastructure device, the location component 120 may determine location information of the person.

The augmented social networking application 105 may comprise a rendering component 125. In an embodiment, a rendering component 125 may present the association information proximate to the person in an augmented reality view using the location information. In an embodiment, the rendering component 125 may render an augmented reality view by presenting at least part of the association information using the location information. In an embodiment, at least part of the association information may be presented on top of, to the side of, next to or underneath, a position of the person in the augmented reality view. In an embodiment, the viewer may simultaneously view both the person and at least some of the association information. For example, the rendered augmented reality view may depict text above a position of the person. The text may state that that person is currently communicating via instant messenger with a person sitting three chairs to the right of them in a conference room.

In an embodiment, the computing device may be a pair of glasses. The viewer may view the person through the transparent lens of the glasses. As a result, no rendering may need to be performed for the image of the person. The rendering component 125 may present the association information. The rendering component 125 may present the association information proximate to the person based on the location information. The rendering component 125 may present the association information on the lens of the glasses thus allowing the viewer an augmented reality view.

In an embodiment, the computing device may be a mobile device. The rendering component 125 may render the image. For example, the computing device may include a camera and the image on the camera may be rendered on the display of the computing device. The rendered image may include a rendered image of the person. In an embodiment, the rendering component 125 may present the association information proximate to the person based on the location information.

In an embodiment, the augmented social networking application 105 may determine the type of or amount of association information to be rendered by the rendering component 125. In an embodiment, the association information may include more information than can be easily viewed by a viewer. For example, the association information may include all people that the viewer and the person know in common. For example, the viewer and the person may know more than 10 people in common. The rendering component 125 may not include each individual that is known by both the viewer and the person. Instead, the rendering component 125 may render only the individuals who the person is closest with or the rendering component may render only the first five individuals in common. For example, the physical location may include many individuals. The rending component 125 may render only one piece of association information for each person in the room.

For example, the viewer may want to determine who to meet at a party. The viewer may want to view the marital status of the people at the party so that the viewer can meet the single people. In an embodiment, the viewer may communicate the preferred type of association information with the augmented social networking application 105 via an input device. In an embodiment, the rendering component 125 of the social networking application 105 may receive one or more control directives from the input device. In an embodiment, the rendering component 125 may display the marital status of a person in the augmented reality view. The viewer may look into the device and see the marital status of the person written above the person's head.

For example, a viewer may want to meet all people who know his closest friends. The viewer may communicate the preferred type of association information with the augmented social networking application 105 via an input device. In an embodiment, the rendering component 125 of the social networking application 105 may receive one or more control directives from the input device. The rendering component 125 may display which people know the viewer's closest friends. For example, the name "Dave" may be presented across a person's body if the person is friends with the viewer's best friend Dave.

Figure 3:
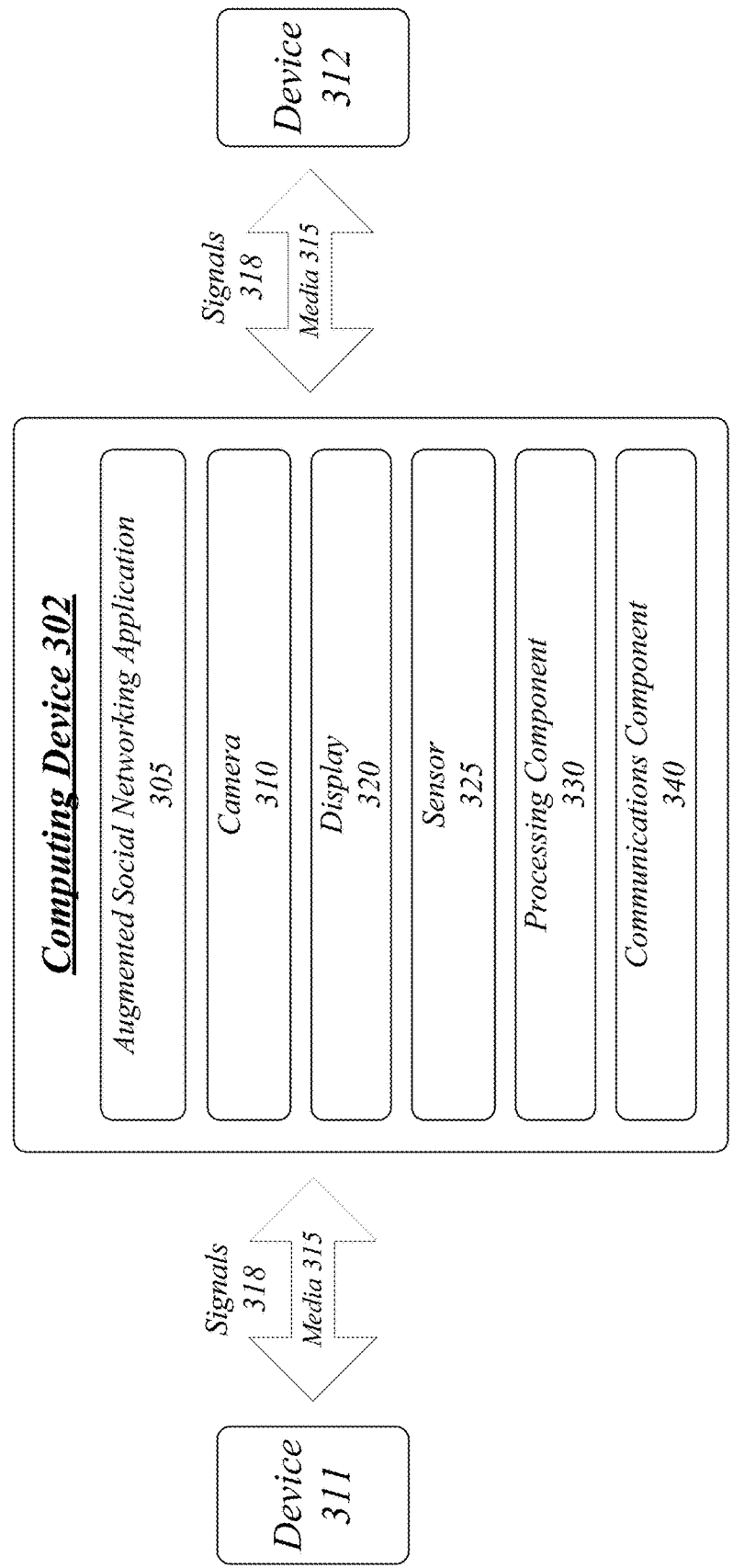
FIG. 3 illustrates an embodiment of a centralized system for the system of FIG. 1.

FIG. 3 illustrates a block diagram of a centralized system 300. The centralized system 300 may implement some or all of the structure and/or operations for the system 100 in a single computing entity, such as entirely within a single computing device 302.

In an embodiment, a computing device 302 may include, but is not limited to, a portable electronic device such as, but not limited to, a laptop computer, a tablet, a mobile device, notebook computer, handheld computer, telephone, cellular telephone, personal digital assistant (PDA), combination cellular telephone, PDA, a viewing device such as a pair of glasses, and so forth.

In an embodiment, the computing device 302 may include an augmented social networking application 305. The augmented social networking application 305 may receive electronic communication. The augmented social networking application 305 may analyze the electronic communication to determine association information for a person. Location information of the person may be determined. The augmented social networking application 305 may present the association information proximate to the person in an augmented reality view using the location information.

In an embodiment, the computing device 302 may include one or more cameras 310. In an embodiment, the cameras 310 may be analog or digital cameras. In an embodiment, the cameras 310 may take still or moving images in a physical location in the real world. The images may include one or more people. The recognition component of the augmented social networking application 305 may use the images to identify a person. In an embodiment, the images from the one or more cameras 310 may determine location information of the person. In an embodiment, the camera may be a stereo camera and may provide the location component of the augmented social networking application 305 with coordinates of the person from the perspective of the viewer's computing device 302.

In various embodiments, a computing device 302 may include a display 320. The display 320 may comprise cathode ray tube (CRTs), liquid crystal displays (LCDs), light emitting diode displays (LEDs), organic light emitting diode displays (OLEDs) or any other type of display. In an embodiment, the display 320 may be partially or semi-transparent eyeglass display. For example, the computing device may be a pair of glasses with at least a partially transparent display. In an embodiment, when the computing device 302 is a pair of glasses, the display 320 may comprise at least one lens and a semi-transparent mirror. In an embodiment, the display 320 may be an optical see-through display and may use one or more mirrors to pass an image of a person through the lens and overlay the association information to be reflected into the viewer's eyes. In an embodiment, when the computing device 302 is a mobile device, the display 320 may include a rendered image taken from the camera 310.

In various embodiments, computing device 302 may include a sensor 325. In an embodiment, the sensor 325 may output a signal to determine a location of one or more people. In an embodiment, the sensor may be an infrared sensor. In an embodiment, the sensor may be a radio-frequency identification sensor. In an embodiment, the sensor may be an electronic image sensor 325 that converts and optical image into an electronic signal. The sensor 325 may work with the camera 310 to determine location information of the person. In an embodiment, the sensor 325 and/or the camera 210 may track the person for the location component in the augmented social networking application 305. In an embodiment, the location information determined by the sensor 325 and/or camera 310 may be used by the display component 320. For example, location information of a person that is determined by sensor 325 may affect the placement of the association information in the rendered augmented reality view. For example, as a person moves, the association information may be rendered in a different location on the display in order for the association information to be presented in a position proximate to the person. The embodiments are not limited to these examples.

The computing device 302 may execute processing operations or logic for the system 100 using a processing component 330. The processing component 330 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 302 may execute communications operations or logic for the system 100 using a communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 315 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 315.

The computing device 302 may communicate with other devices 311, 312 over a communications media 315 using communications signals 318 via the communications component 340.

In an embodiment, the other devices 311, 312 may be computing devices. In an embodiment, the other device 311, 312 may have one or more of cameras, sensor and/or a radio-frequency identification chip. The augmented social networking application 305 on the computing device 302 may determine a person's identity and/or determine association information for a person based on the cameras, sensors and/or radio-frequency identification chip in the other device 311, 312.

Figure 4:
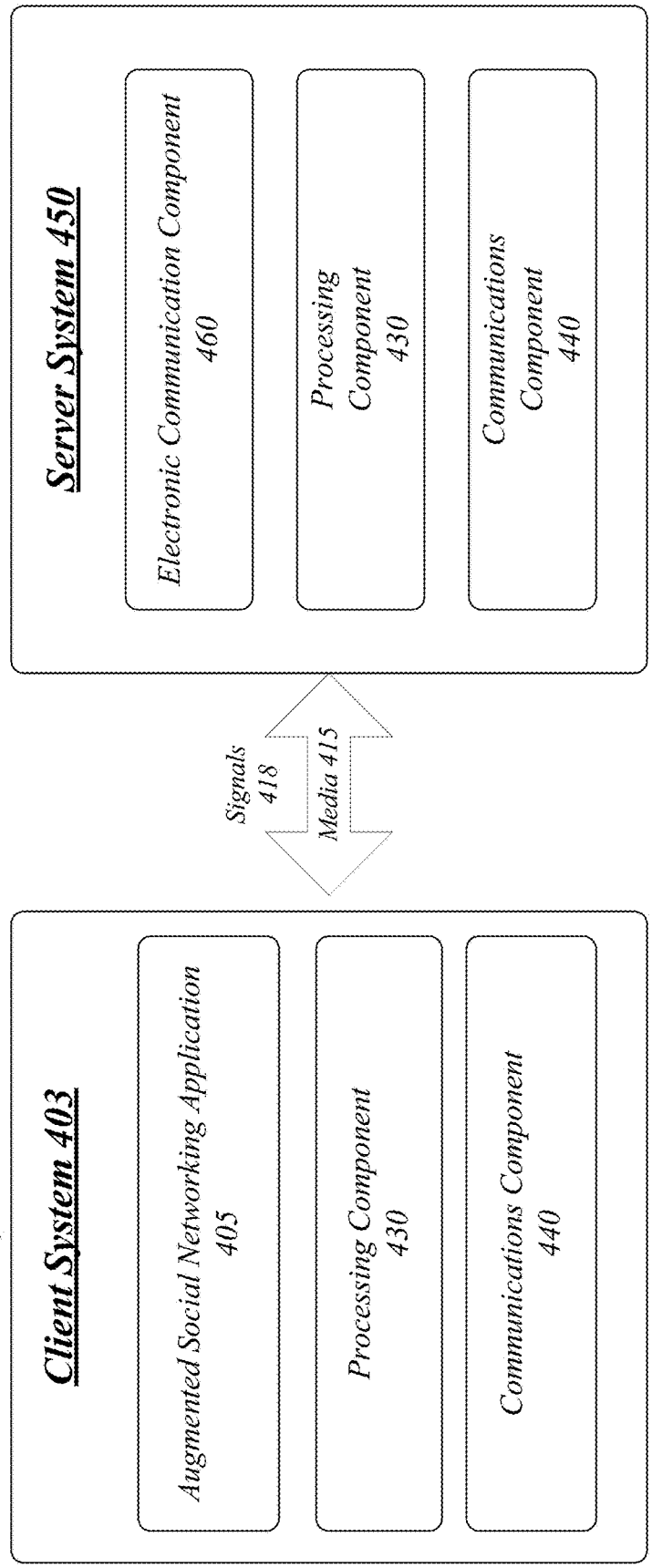
FIG. 4 illustrates an embodiment of a distributed system for the system of FIG. 1.

FIG. 4 illustrates a block diagram of a distributed system 400. The distributed system 400 may distribute portions of the structure and/or operations for the systems 100, 300 across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 403 and the server system 450 may process information using the processing components 430, which are similar to the processing component 330 described with reference to FIG. 3. The client system 403 and the server system 450 may communicate with each over a communications media 415 using communications signals 418 via communications components 440, which are similar to the communications component 340 described with reference to FIG. 3.

In one embodiment, for example, the distributed system 400 may be implemented as a client-server system. A client system 403 may implement the augmented social networking application 405. A server system 450 may implement the electronic communication component 460.

In various embodiments, the client system 403 may comprise or employ one or more client computing devices and/or client programs that operate to perform various methodologies in accordance with the described embodiments. The client system 403 may receive electronic communication from the server system 450. The client system 403 may analyze the electronic communication to determine association information. In an embodiment, the client system 403 may analyze electronic communication for the person. In an embodiment, the client system 403 may analyze electronic communication for one or more of the people in a particular physical location.

In various embodiments, the server system 450 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 430 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

In an embodiment, the server system 450 may include an electronic communication component 460. Electronic communication may include metadata from social networking platforms, email, instant messaging and/or short message service. Electronic communication may be gathered based on a person. In an embodiment, the electronic communication may include past or prior information from the person, such as, but not limited to, who the person previously emailed, and/or current information from the person, such as, but not limited to, who the person is currently instant messaging.

The server system 450 may receive a request from the client system 403 to send electronic communication to the client system 403. In an embodiment, the request may be for electronic communication based on one or more people. In an embodiment, the server system 450 may send the electronic communication based on the one or more people to the client system 403. In an embodiment, the client system 403 may receive the electronic communication. The client system 403 may analyze the electronic communication to determine association information.

Figure 5:
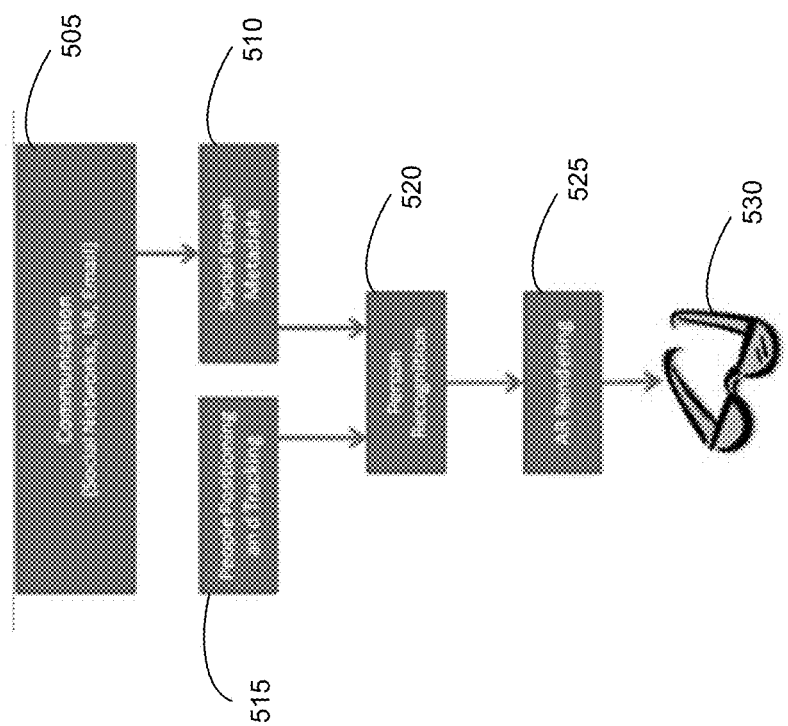
FIG. 5 illustrates the various components of the system of FIG. 2.

FIG. 5 illustrates a process flow of the system. The various components may be used together to form an augmented reality view based on social networking and electronic communication. In an embodiment, electronic communication 505 may be gathered. The communication 505 may include, but is not limited to, social networks, instant messages and/or emails. In an embodiment, the communication may be compiled to create social graph metadata 510. The social graph metadata 510 may be a form of association information. The social graph metadata 510 may be a way that the association information is organized. The social graph metadata 510 may allow the association information to be easily retrieved by the rendering component. In an embodiment, the social graph metadata 310 may be created by the association information component 115 in FIG. 2.

As the metadata 510 is formed, people positioning and tracking 515 may occur. In an embodiment, the people positioning and tracking 515 may occur at the same time as the forming of the metadata. The people positioning and tracking 515 may determine location information for one or more people in a physical location. In an embodiment, the people positioning and tracking 515 may provide location information as to the relative positioning of a person in three dimensional space. The location information may be used in rendering the association information in the augmented reality view. In an embodiment, the location information may include x, y, z coordinates of a person on a three dimensional graph.

In an embodiment, the people positioning and tracking 515 may be determined based on the physical location of the location component 120 in FIG. 2. For example, a viewer may be in a location wearing a pair of glasses 530 which include a computing device 302 with the augmented social network application 305 in FIG. 3. The location component 120 in the augmented social networking application 305 may determine the location information of a person. In one embodiment, the position the person may be determined based on the position of the computing device 305 worn by the viewer. For example, a person may be tracked and his/her position determined based on the computing device worn by the viewer. The person may be determined to be at a 45 degree angle from the computing device worn by the viewer and 1 meter away. The person's position may be tracked by one or more cameras 310 and/or sensors 325 as he/she moves across the floor.

Figure 6:
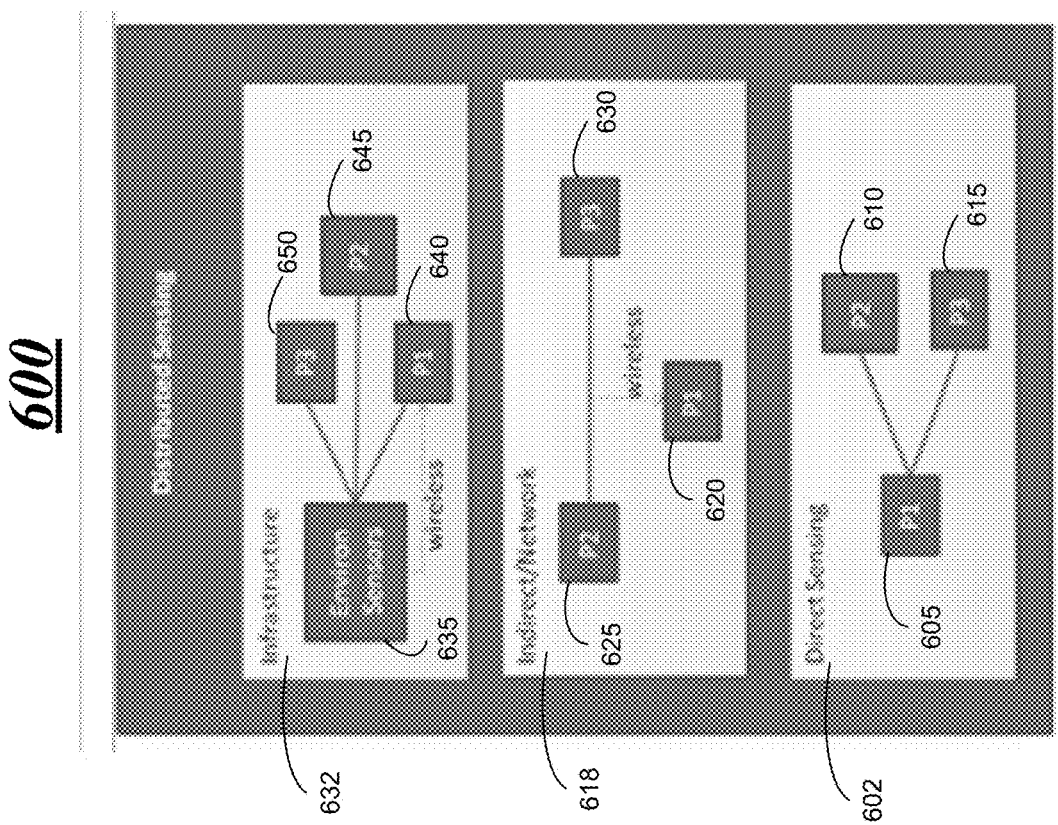
FIG. 6 illustrates embodiments of determining location information.

FIG. 6 illustrates embodiments of determining location information. In an embodiment, the computing device may include the location component 120 in the augmented social networking application 105. In an embodiment, the location component may receive location information from direct sensing 602, indirect/network sensing 618 and/or infrastructure sensing 632.

In an embodiment, the location of the person may be determined and tracked via direct sensing 602. In an embodiment, in direct sensing 602, the location information of the person may be determined from the computing device 302 worn by a viewer. In an embodiment, the location component 120 may directly determine the location information and track the person using one or more cameras, stereo cameras, sensors, infrared sensors and/or a radio-frequency identification device.

In an embodiment, the computing device may be worn as a pair of glasses by the viewer. As the computing device is worn over the eyes of the viewer, the location component 120 may track one or more people in the viewer's field of view. For example, in direct sensing 602, a viewer 605 may directly track a first person 610 and a second person 615. For example, there may be a camera on the viewer's computing device 605 and the image may be used to determine the location information for the first person 610 and the second person 615. With direct sensing 602, the location information for the first person 610 and second person 615 may be determined directly from the viewer's computing device 605 and the location information may be from the point of view of the viewer's computing device 605.

In an embodiment, the location component 120 may indirectly 618 receive location information about a person. In an embodiment, using indirect and/or network sensing 618, the location component 120 may wirelessly receive location information about the people 625, 630.

For example, a viewer's computing device 620 may not have direct access to a first person 625. In an embodiment, the computing device may be worn as a pair of glasses by the viewer 620, but the viewer 620 cannot view the first person 635 and does not have direct access to the first person 625. However, a viewer 620, the first person 625 and a second person 630 may all be in the same physical location. In an embodiment, the viewer's computing device 620 may wirelessly receive location information about the first person 625 from the second person 630. In an embodiment, the viewer 620 may have direct access to the second person 630, but not the first person 625. However, the second person's computing device 630 may have direct access to the first person 625. The second person's computing device may determine location information for the first person. Accordingly, the location component used by the viewer's computing device 620 may wirelessly receive location information about the first person 625 via the second person's computing device 630. As the received location information may be from the perspective of the second person, the location component in the viewer's computing device may need to determine location information from the perspective of the viewer's computing device.

In an embodiment, the location component 120 may use infrastructure sensing 632 in the physical location to receive location information about the people 645, 650. In an embodiment, infrastructure sensing 132 may include, but is not limited to, an infrastructure device such as, but not limited to, one or more cameras and/or sensors. In an embodiment a sensor may include, but is not limited to, an infrared sensor and/or a radio-frequency identification device. For example, the infrastructure device 635 may be embedded in the ceiling of a coffeehouse. In an embodiment, infrastructure device 635 may communicate wirelessly with the viewer's computing device 640. In an embodiment, the infrastructure device 635 may determine location information for a first person 645 and a second person 650 in the physical location, such as the coffeehouse. The infrastructure device 635 may wirelessly communicate the location information of the first and second people 645, 650 to the viewer's computing device 640. The viewer's computing device 640 may include a gyro sensor and or infrared beacons in order to determine where a viewer is located in relation to the location information provided by the infrastructure device 635. For example, if the viewer's computing device 640 includes an infrared beacon, the received infrared signals may be triangulated. The triangulated signal may allow the location component to use the received location information from the infrastructure device to determine location information of the first person and the second person based on the viewer's computing device.

Referring back to FIG. 5, the social graph metadata 510 and the location information from the people positioning and tracking 515 may be used to determine person recognition 520. In an embodiment, person recognition may occur by the recognition component 105 in FIG. 2. Person recognition 520 may determine an identity of a person in an image and determine association information for the person. The image may be taken by a camera in the viewer's computing device. The image from the camera may be used by the location component 120 to determine location information of the person in the image. In an embodiment, the recognition component 105 may determine an identity of the person in the image. In an embodiment, image, skin color and/or facial recognition technologies may be used to identify the person in the image. In an embodiment, the metadata 510 may include one or more images of the person. For example, a person may have a picture on Skype®, and/or a profile picture on Facebook® and/or a picture on instant messenger. One or more of these photographs may be used for person recognition 520. For example, a photograph of the person may be from an image taken by a camera 310 on the computing device 305. The identity of the person 520 may be determined by comparing the photograph of the person with photographs in the metadata 510.

In an embodiment, the person recognition 520 may be sent to a rendering component for augmented reality rendering 525. The rendering component 125 in FIG. 1 may render a visualization on the computing device. In an embodiment, the visualization may be rendered from the computing device. In an embodiment, the augmented reality rendering may position the social graph metadata according to the location component. In an embodiment, the rendering may present the association information proximate to the person in an augmented reality view using the location information.

Included herein is a set of flow charts representative of exemplary methodologies for performing novel aspects of the disclosed architecture. While, for purposes of simplicity of explanation, the one or more methodologies shown herein, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
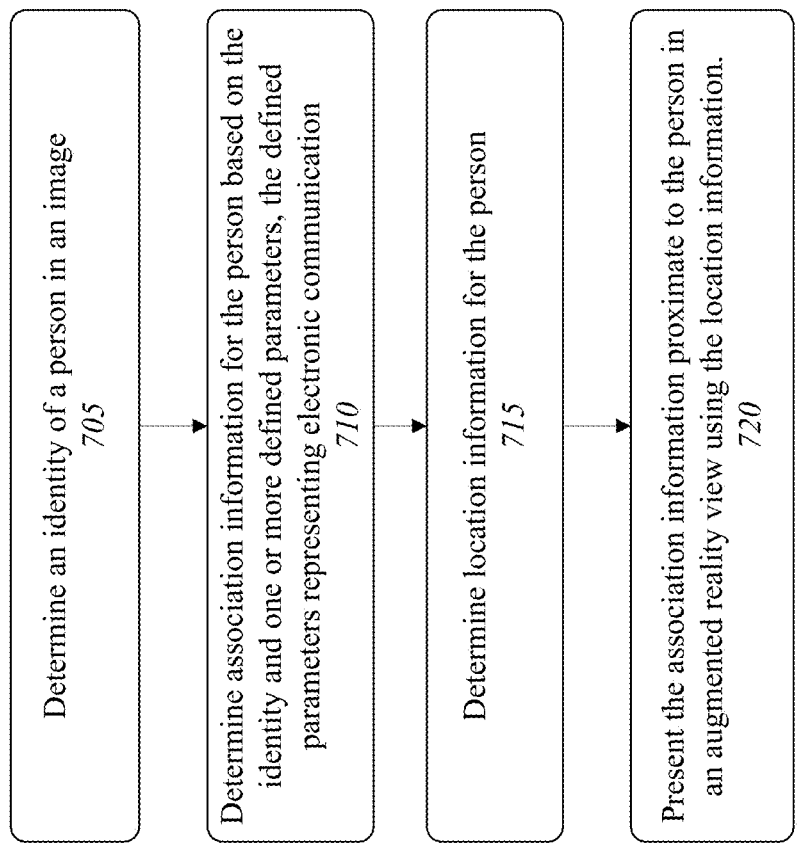
FIG. 7 illustrates an embodiment of a logic flow.

FIG. 7 illustrates one embodiment of a logic flow. The logic flow 700 may be representative of some or all of the operations executed by one or more embodiments described herein.

In the illustrated embodiment shown in FIG. 7, the logic flow 700 may determine an identity of a person in an image at block 705. In an embodiment, a camera and/or sensor in a computing device may create the image. The image may include objects and at least one object may be a person. The augmented social networking application may receive the image and determine that there is at least one person in the image via image, color and/or facial recognition technologies.

In an embodiment, the identity of the person in the image may be determined via facial recognition. In an embodiment, the image of the person may be a photograph of that person. To determine the identity of the person, the photograph of the person may be compared to one or more photographs from the electronic communication. In an embodiment, the person's photograph may be compared to profile pictures from Facebook®.

The logic flow 700 may determine association information for a person by analyzing one or more defined parameters, the defined parameters representing electronic communication at block 710. In an embodiment, electronic communication may include information from social networking websites and/or emails, instant messages and/or short message service. In an embodiment, an augmented social networking application may receive the association information. In an embodiment, the association information may be received from a remote source, such as, but not limited to a network server.

In an embodiment, a viewer may be in the same physical location as a person. The electronic communication of the person may be analyzed to determine association information. In an embodiment, a graph of association information may be extracted from the electronic communication. In an embodiment, the electronic communication may be characterized based on a characteristic of the electronic communication, length of time of the electronic communication, such as how long the electronic communication has been in place, and the frequency of the electronic communication between a first person and a second person. In an embodiment, the electronic communication may be analyzed using one or more of semantic analysis, natural language processing and statistical analysis.

In an embodiment, the computing device may use radio-frequency identification chips or infrared beacons to determine association information for the person. For example, the person may be associated with a device which contains a radio-frequency identification chips and the viewer's computing device may use the radio-frequency identification chip from the person's device to determine the association information for the person.

The logic flow 700 may determine location information of the person at block 715. In an embodiment, a first person in the viewer's field of view may be directly tracked. For example, a viewer may be a person wearing the computing device. The computing device may directly track people using one or more of, cameras, stereo cameras, sensors, infrared sensors and/or a radio-frequency identification device. In an embodiment, the location information for the first person may determined directly by the viewer's computing device. In an embodiment, the computing device may not be able to directly track the first person as the viewer may not be in view of the first person, but a second person with a computing device may track the first person. The viewer's computing device may receive location information about the first person wirelessly from the second person's computing device. In an embodiment, an infrastructure device may provide the viewer with location information of the person.

The logic flow 700 may render an augmented reality view by presenting at least part of the association information proximate to the person in an augmented reality view using the location information at block 720. In an embodiment, the association information may be rendered in one or more locations proximate to the person. For example, the association information may be rendered above the person, below the person, on the person, to the right of the person and/or to the left of the person. In an embodiment, the association information may include information such as the marital status and/or the profession of the person. In an embodiment, the association information may include information that the person has in common with the viewer where the viewer is the person viewing the augmented reality. In an embodiment, the viewer is the person reading the association information. In an embodiment, when the computing device is a mobile device, the presenting may include rendering an image on a display and superimposing text on the display to render text proximate the position of the person in the image in real-time. In an embodiment, when the computing device is a pair of glasses, the presenting may include superimposing text on a semi-transparent display to render text proximate to the position of the person in real-time.

Figure 8:
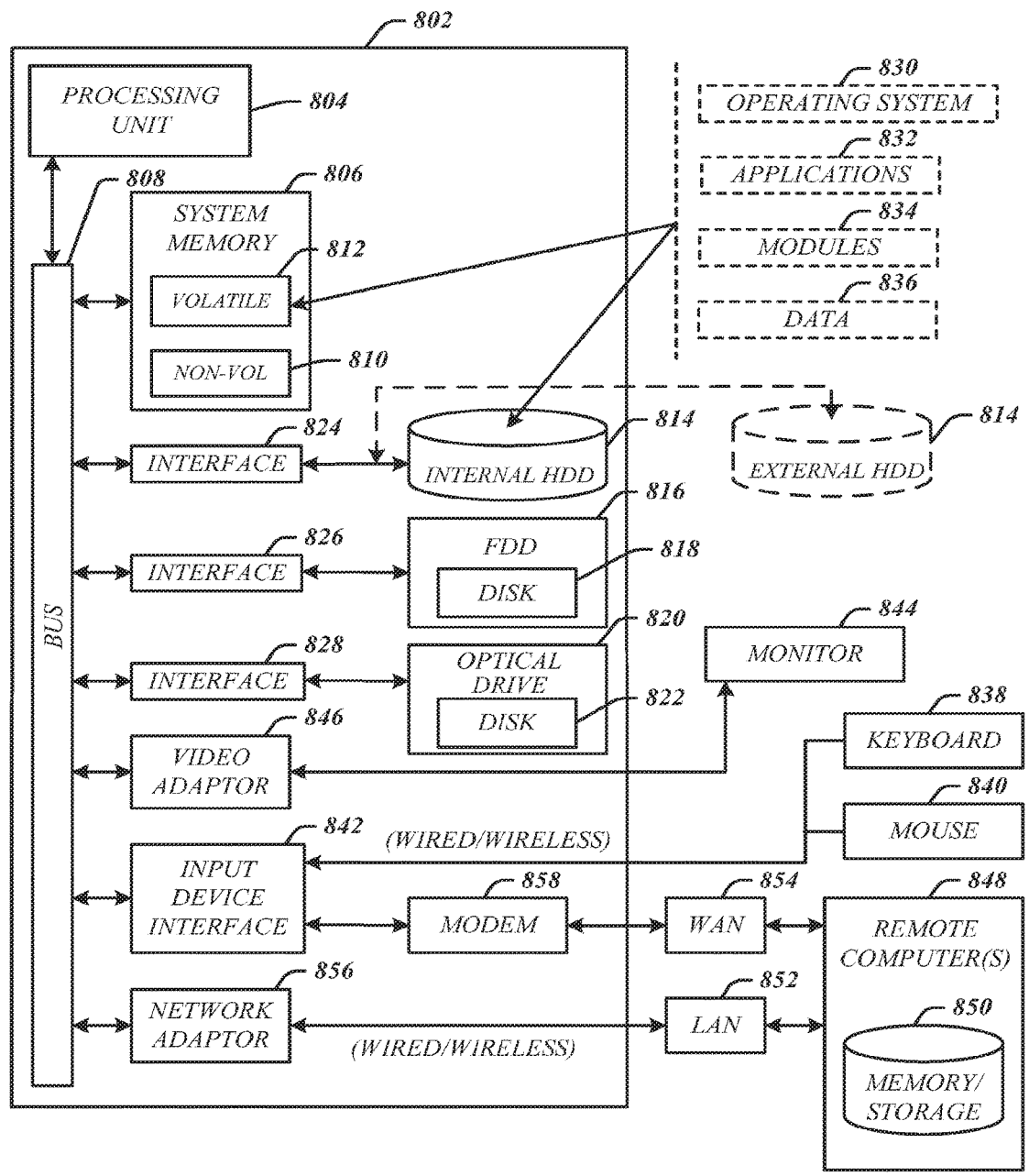
FIG. 8 illustrates an embodiment of a computing architecture.

FIG. 8 illustrates an embodiment of an exemplary computing architecture 800 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

The one or more application programs 832, other program modules 834, and program data 836 can include, for example, the search component 122 and the rendering component 125.

A viewer can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
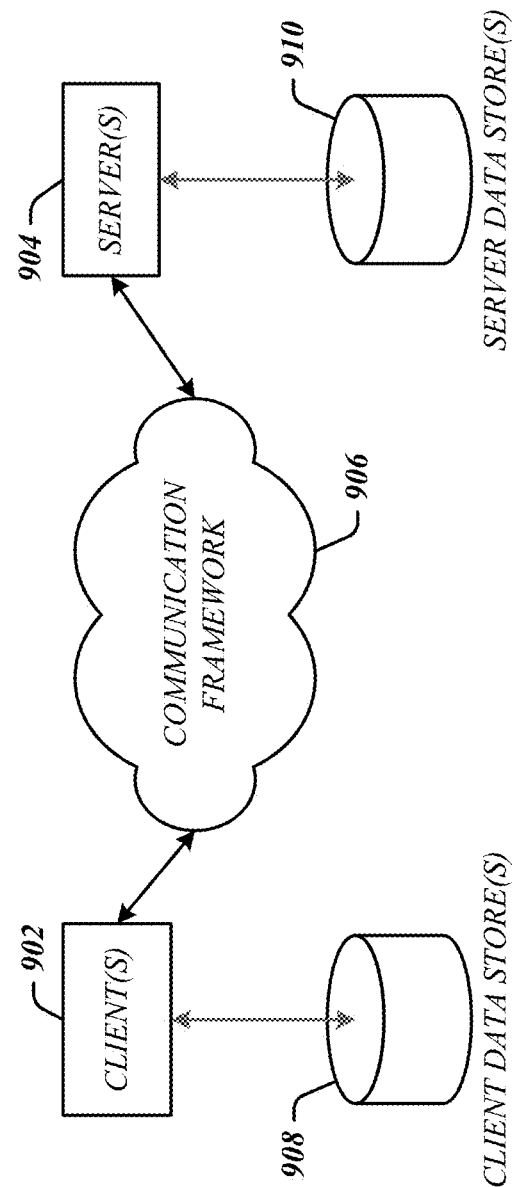
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the client systems 400. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols, such as those described with reference to systems 300 and 800. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the characteristic of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

In an embodiment, a computer-implemented method may include receiving an image. After receiving the image, in real time, an identity of a person in the image may be determined. Association information for the person may be determined in real time based on the identity and one or more defined parameters. The defined parameters may represent electronic communication. Location information of the person may be determined in real time. The association information may be presented proximate to the person in an augmented reality view using the location information. One or more of electronic mail, instant messaging, short message service or social networking information may be analyzed. A graph of the association information may be extracted based on the electronic communication. The electronic communication may be characterized based on a characteristic of the electronic communication, the characteristic of the electronic communication comprising one or more a length of time or a frequency. The electronic communication may be analyzed using one or more of semantic analysis, natural language processing or statistical analysis. Location information of the person may be determined via a stereo camera. The location information may be received from a computing device over a wireless connection. The location information may be received via an infrastructure device. The location information of the person may be determined via one or more of a stereo camera or an infrared sensor in a physical location. The identity of the person may be determined via facial recognition. The identity of the person may be determined by comparing a first photograph taken from the image to a second photograph taken by the electronic communication. At least part of the association information may be presented above a position of the person in the augmented reality view. The augmented reality view may be rendered on a semi-transparent eyeglass display.

In an embodiment, at least one machine readable medium may include a plurality of instructions that in response to being executed on a computing device cause the computing device to carry out the method of receiving an image. After receiving and image, in real time, the instructions may cause the computing device to determine an identity of a person in the image; determine association information for the person based on the identity and one or more defined parameters, the defined parameters representing electronic communication and determine location information of the person; and presenting the association information proximate to the person in an augmented reality view using the location information.

In an embodiment, an apparatus may include means for performing the method of receiving an image, after receiving the image, in real time: determining an identity of a person in the image; determining association information for the person based on the identity and one or more defined parameters, the defined parameters representing electronic communication; determining location information of the person; and presenting the association information proximate to the person in an augmented reality view using the location information.

In an embodiment, the system may include an apparatus configured to perform the method of receiving an image and after receiving the image, in real time: determining an identity of a person in the image; determining association information for the person based on the identity and one or more defined parameters, the defined parameters representing electronic communication; determining location information of the person; and presenting the association information proximate to the person in an augmented reality view using the location information and a camera In an embodiment, an apparatus may include a processor circuit and an augmented social networking application operatively coupled to the processor circuit. The augmented social networking application may include a recognition component operative to receive an image and determine an identity of a person in the image in real time. The augmented social networking application may include a location component operative to determine location information of the person in real time and a rendering component operative to present association information proximate to the person in an augmented reality view using the location information in real time.

In an embodiment, the augmented social networking application may include an association information component operative to determine association information for the person based on the identity and one or more defined parameters, the defined parameters representing electronic communication. The augmented social networking application may include an association information component operative to determine the association information for the person, the association information including the person's name.

In an embodiment, the apparatus may include a digital antenna operatively coupled to the processor circuit. The apparatus may include a camera operatively coupled to the processor circuit, the camera to track the person. The apparatus may include a digital display operatively coupled to the processor circuit. The apparatus may include a semi-transparent eyeglass display coupled to the processor circuit.

The invention claimed is:

1. An apparatus, comprising:
a processor circuit; and
an augmented social networking application operatively coupled to the processor circuit, the augmented social networking application comprising:
a recognition component operative to:
receive an image;
determine an identity of a first person and a second person in the image in real time;
a location component operative to determine location information of the first person in real time;
an association information component to create association information between the first person, the second person, and a viewer, the association information extracted from an analysis of electronic communications, a first of the electronic communications linked to the first person and the viewer and a second of the electronic communications linked to the first person and the second person, the analysis comprising characterizing at least one of the electronic communications based on a characteristic of the at least one electronic communication, the characteristic of the at least one electronic communication comprising one or more of a length of time and a frequency; and
a rendering component operative to present the association information proximate to the first person in an augmented reality view using the location information in real time, the association information presented to indicate the first and second persons are currently communicating, and is a subset of determined association information available to the rendering component.

2. The apparatus of claim 1, the association information component operative to determine the association information between the first person, the second person, and the viewer based on the identity of the first person and one or more defined parameters, the defined parameters representing one or more of the electronic communications.

3. The apparatus of claim 1, the association information including the first person's name.

4. The apparatus of claim 1, comprising:
a digital antenna operatively coupled to the processor circuit.

5. The apparatus of claim 1, comprising:
a camera operatively coupled to the processor circuit, the camera to track the first person.

6. The apparatus of claim 1, comprising:
a digital display operatively coupled to the processor circuit.

7. The apparatus of claim 1, comprising:
a semi-transparent eyeglass display operatively coupled to the processor circuit.

8. A computer-implemented method, comprising:
receiving an image; and
after receiving the image, in real time:
determining an identity of a first person and a second person in the image;
determining association information between the first person, the second person, and a viewer based on the identity of the first person and one or more defined parameters, the one or more defined parameters representing electronic communications, a first of the electronic communications linked to the first person and the viewer and a second of the electronic communications linked to the first person and the second person;
characterizing at least one of the electronic communications based on a characteristic of the at least electronic communication, the characteristic of the at least one electronic communication comprising one or more a length of time or a frequency;
determining location information of the first person;
curtailing the association information; and
presenting the curtailed association information proximate to the first person in an augmented reality view using the location information, the curtailed association information to indicate the first and second persons are currently communicating.

9. The computer-implemented method of claim 8, comprising:
analyzing one or more of electronic mail, instant messaging, short message service or social networking information.

10. The computer-implemented method of claim 8, comprising:
extracting a graph of the association information based on the electronic communications.

11. The computer-implemented method of claim 8, comprising:
analyzing the electronic communications using one or more of semantic analysis, natural language processing or statistical analysis.

12. The computer-implemented method of claim 8, comprising:
determining location information of the first person via a stereo camera.

13. The computer-implemented method of claim 8, comprising:
receiving the location information from a computing device over a wireless connection.

14. The computer-implemented method of claim 8, comprising:
receiving the location information via an infrastructure device.

15. The computer-implemented method of claim 8, comprising:
determining the location information of the first person via one or more of a stereo camera or an infrared sensor in a physical location.

16. The computer-implemented method of claim 8, comprising:
determining the identity of the first person via facial recognition.

17. The computer-implemented method of claim 8, comprising:
determining the identity of the first person by comparing a first photograph taken from the image to a second photograph taken by one or more of the electronic communications.

18. The computer-implemented method of claim 8, comprising:
presenting at least part of the association information above a position of the first person in the augmented reality view.

19. The computer-implemented method of claim 8, comprising:
rendering the augmented reality view on a semi-transparent eyeglass display.

20. At least one machine readable medium comprising a plurality of instructions that in response to being executed on a computing device cause the computing device to
receive an image; and
after receiving the image, in real time:
determine an identity of a first person and a second person in the image;
determine association information between the first person, the second person, and a viewer based on the identity of the first person and one or more defined parameters, the one or more defined parameters representing electronic communications, a first of the electronic communications linked to the first person and the viewer and a second of the electronic communications linked to the first person and the second person;
characterize at least one of the electronic communications based on a characteristic of the at least one electronic communication, the characteristic of the at least one electronic communication comprising one or more a length of time or a frequency;
determine location information of the first person;
curtail the association information; and
render the curtailed association information proximate to the first person in an augmented reality view using the location information, the curtailed association information to indicate the first and second persons are currently communicating.

21. The at least one machine readable medium of claim 20 comprising a plurality of instructions that in response to being executed on a computing device cause the computing device to render the augmented reality view on a semi-transparent eyeglass display.

22. The at least one machine readable medium of claim 20 comprising a plurality of instructions that in response to being executed on a computing device cause the computing device to determine location information of the first person via a stereo camera.

23. The at least one machine readable medium of claim 20 comprising a plurality of instructions that in response to being executed on a computing device cause the computing device to receive the location information from a computing device over a wireless connection.

24. The at least one machine readable medium of claim 20 comprising a plurality of instructions that in response to being executed on a computing device cause the computing device to receive the location information via an infrastructure device.

25. The at least one machine readable medium of claim 20 comprising a plurality of instructions that in response to being executed on a computing device cause the computing device to determine the location information of the first person via one or more of a stereo camera or an infrared sensor in a physical location.

* * * * *